(No Model.)

W. SCHERER.
NUT LOCK.

No. 598,747.　　　　　　　　　　Patented Feb. 8, 1898.

WITNESSES
J. Frank Culverwell,
Henry H. Byrne

INVENTOR,
William Scherer.
By John Wedderburn Attorney

THE NORRIS PETERS CO., PHOTO-LITHO., WASHINGTON, D. C.

UNITED STATES PATENT OFFICE.

WILLIAM SCHERER, OF SOUTH CHICAGO, ILLINOIS, ASSIGNOR OF ONE-HALF TO JACOB A. SCHERER, OF SAME PLACE.

NUT-LOCK.

SPECIFICATION forming part of Letters Patent No. 598,747, dated February 8, 1898.

Application filed December 1, 1896. Serial No. 614,130. (No model.)

*To all whom it may concern:*

Be it known that I, WILLIAM SCHERER, a citizen of the United States, residing at South Chicago, in the county of Cook and State of Illinois, have invented certain new and useful Improvements in Nut-Locks; and I do hereby declare the following to be a full, clear, and exact description of the invention, such as will enable others skilled in the art to which it appertains to make and use the same.

My invention relates to nut-locks.

My object is to provide a nut-lock of extremely simple and cheap construction which can be readily made secure but unlocked whenever desirable.

Having these objects in view, the invention consists in a nut-lock comprising certain improved features and novel combinations of parts appearing more fully hereinafter.

Figure 1:
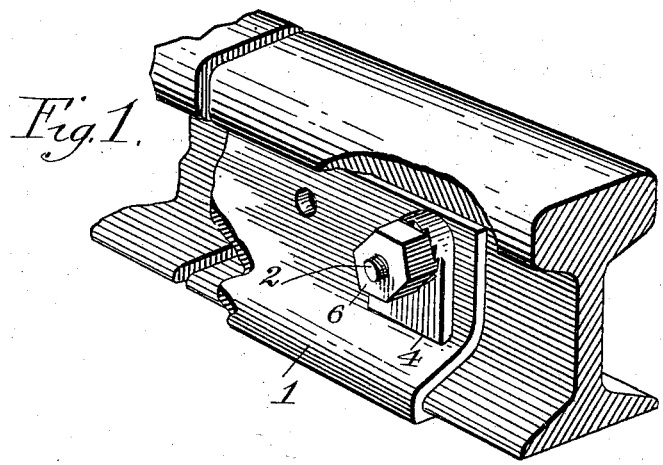
Figure 2:
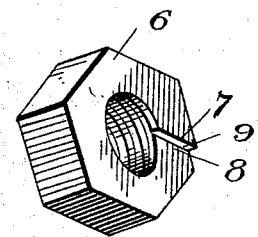
Figure 3:
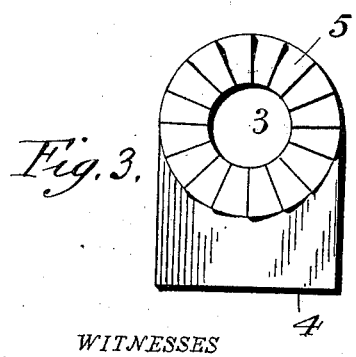

In the accompanying drawings, Figure 1 is a perspective view showing my improved nut-lock used in connection with a rail-joint; Fig. 2, a perspective detail of the nut; Fig. 3, a front view of the washer used with the nut on rail-joints.

The numeral 1 designates a fish-plate, and 2 a bolt passing therethrough. The form of washer employed is shown in Fig. 3, the same being centrally apertured at 3 for the reception of the bolt and having a straight lower edge 4, which rests snugly against the fish-plate. The outer face of the washer is provided with radiating teeth 5. It will be seen that by the engagement of the straight edge of the washer with the fish-plate the washer is prevented from turning.

My improved nut is designated by the numeral 6. The highest point of the face of the nut is shown at 7. The face inclines from its point around the opening in the nut until at the point 8 it is somewhat lower than the point 7, so that a shoulder 9 is formed which is adapted to engage with the teeth of the washer, whereby the nut is locked in position.

Having thus described the invention, what is claimed as new is—

The herein-described nut-lock for rail-joints, comprising a bolt, a washer which receives the bolt and is provided with a straight edge adapted to engage with the fish-plate, said washer having radiating teeth on its face, and a nut having its face formed with a single circularly-extending cam-incline and a locking-shoulder adapted to engage with the teeth of the washer.

In testimony whereof I have signed this application in the presence of two subscribing witnesses.

WILLIAM SCHERER.

Witnesses:
W. P. QUINBY,
C. H. HOWARD.